US012007094B1

(12) United States Patent
Xu et al.

(10) Patent No.: US 12,007,094 B1
(45) Date of Patent: Jun. 11, 2024

(54) LIGHTING APPARATUS

(71) Applicant: LEEDARSON LIGHTING CO., LTD., Fujian (CN)

(72) Inventors: Deshun Xu, Fujian (CN); Haiqiang Chen, Fujian (CN); Wanzhen Liang, Fujian (CN)

(73) Assignee: LEEDARSON LIGHTING CO., LTD., Fujian (CN)

( * ) Notice: Subject to any disclaimer, the term of this patent is extended or adjusted under 35 U.S.C. 154(b) by 0 days.

(21) Appl. No.: 18/212,167

(22) Filed: Jun. 20, 2023

(51) Int. Cl.

| | |
|---|---|
| ***F21S 8/04*** | (2006.01) |
| ***F21V 21/03*** | (2006.01) |
| ***F21V 23/00*** | (2015.01) |
| ***F21V 23/04*** | (2006.01) |
| *F21Y 115/10* | (2016.01) |

(52) U.S. Cl.
CPC .............. *F21S 8/043* (2013.01); *F21V 21/03* (2013.01); *F21V 23/009* (2013.01); *F21V 23/0464* (2013.01); *F21Y 2115/10* (2016.08)

(58) Field of Classification Search
CPC ........ F21S 8/043; F21V 21/03; F21V 23/009; F21V 23/0464
See application file for complete search history.

(56) References Cited

U.S. PATENT DOCUMENTS

| | | | | |
|---|---|---|---|---|
| 9,322,533 | B1 * | 4/2016 | Pearson | F21V 23/06 |
| 11,561,457 | B1 * | 1/2023 | Triplett | G03B 15/05 |
| 2021/0388973 | A1 * | 12/2021 | Lee | F21S 8/026 |
| 2022/0228730 | A1 * | 7/2022 | Li | F04D 25/088 |
| 2023/0213156 | A1 * | 7/2023 | Boulanger | F21S 8/061 362/249.02 |

* cited by examiner

*Primary Examiner* — Christopher E Dunay
(74) *Attorney, Agent, or Firm* — Chun-Ming Shih; LANWAY IPR SERVICES

(57) ABSTRACT

A lighting apparatus includes a bracket, a fixing unit and a light body. The bracket is attached to an installation surface. The bracket has a bracket hook. The bracket hook is extended downwardly from the installation surface. The bracket hook has a horizontal part and a vertical part. An angle between horizontal part and the vertical is between 60 degrees to 120 degrees. The fixing unit has a plug, an elastic device and a unit housing. The plug has a first end and a second end. The plug and the elastic device are disposed in the unit housing. The second end is coupled to the elastic device. There is an adjustable entrance with a first diameter between the first end of the plug and the unit housing.

13 Claims, 6 Drawing Sheets

LIGHTING APPARATUS

FIELD

The present invention is related to a lighting apparatus, and more particularly related to a lighting apparatus with a reliable fixing structure.

BACKGROUND

LED light devices have become a game-changer in the lighting industry, offering several advantages over past designs such as incandescent and fluorescent lights. One of the primary advantages of LED light devices is their energy efficiency. LEDs are incredibly efficient in converting electricity into light, resulting in significant energy savings compared to traditional lighting technologies. They consume much less power while providing the same or even better illumination, making them a cost-effective choice for both residential and commercial lighting applications.

Another advantage of LED light devices is their long lifespan. LEDs have an impressive operational life that can range from 25,000 to 50,000 hours or even more, depending on the quality of the LEDs and their usage. This longevity far exceeds that of traditional incandescent or fluorescent lights, which need frequent replacements. LED light devices not only reduce maintenance costs but also contribute to reducing waste and the environmental impact associated with frequent bulb replacements.

LED light devices also offer enhanced durability and robustness. Unlike incandescent bulbs, LEDs are solid-state devices that do not contain fragile filaments or glass components. This makes them highly resistant to shocks, vibrations, and other physical impacts, making them ideal for applications in rugged environments or areas prone to frequent movement or vibration.

Additionally, LED light devices provide instant illumination without the need for warm-up time. Unlike fluorescent lights that can take a few seconds to reach full brightness, LEDs light up immediately, allowing for instant illumination when you flip the switch. This feature is particularly beneficial in areas where immediate lighting is required, such as hallways, bathrooms, or outdoor spaces.

LED light devices are also highly customizable in terms of color options and dimming capabilities. With the ability to emit light in various colors and shades, LED lights offer versatility in creating different lighting effects and moods. Additionally, LEDs can be easily dimmed, allowing users to adjust the brightness levels according to their preferences or specific lighting needs. This flexibility in color and dimming options makes LED light devices suitable for a wide range of applications, from ambient lighting to task lighting and even decorative purposes.

When it comes to controlling LED light devices, traditional wall switches can be used. LED lights are compatible with standard wall switches found in most homes and buildings. However, it's important to note that some LED light devices, especially those with advanced features like color-changing or dimming capabilities, may require specific dimmer switches or controllers for optimal functionality. These specialized switches or controllers are designed to work with the specific electrical requirements of LED lights, ensuring smooth and reliable operation without flickering or compatibility issues.

In recent years, there have been advancements in LED light device control systems, such as the introduction of smart lighting solutions. Smart LED light devices can be controlled wirelessly through smartphone apps, voice commands, or home automation systems. These smart features provide additional convenience, allowing users to adjust lighting settings, create schedules, and even integrate their LED lights with other smart devices for a seamless home automation experience.

In summary, LED light devices offer numerous advantages over past lighting designs. They are energy-efficient, long-lasting, durable, and provide instant illumination. LED lights are highly customizable in terms of color options and dimming capabilities, making them versatile for various applications. Despite their advanced features, LED light devices can still be controlled by traditional wall switches, ensuring compatibility with existing electrical infrastructure. Additionally, the emergence of smart lighting solutions has brought added convenience and flexibility to LED light device control. Overall, LED light devices have revolutionized the lighting industry, providing efficient, long-lasting, and customizable lighting solutions for homes, businesses, and beyond.

Power supply and flexible control are critical to provide a nice LED light device. Power design is crucial for LED devices due to several factors such as cost, flexibility, stability, and the integration of IoT technology.

Firstly, cost plays a significant role in LED device design. LED lights are known for their energy efficiency, but inefficient power design can offset those benefits. A well-designed power system ensures optimal energy conversion and distribution, maximizing the cost-effectiveness of LED devices. Efficient power designs minimize power losses, resulting in lower electricity bills and overall operational costs.

Secondly, flexibility is essential in LED device power design. LED lights come in various forms, sizes, and applications, and each may have specific power requirements. A well-designed power system should accommodate different voltage and current needs, allowing LED devices to operate reliably and efficiently across a wide range of configurations. Flexibility in power design ensures compatibility with different LED products, enabling seamless integration and ease of use.

Thirdly, stability is crucial in LED device power design. Stable power supply is necessary to ensure consistent light output and prevent flickering or fluctuations that can be detrimental to visual comfort and quality. A robust power design with proper voltage regulation, current control, and surge protection safeguards LED devices from voltage spikes, transient events, and electrical noise, enhancing their reliability and longevity.

Furthermore, the combination of IoT technology with LED devices amplifies the importance of power design. IoT integration enables smart lighting capabilities, allowing LED devices to be connected, controlled, and monitored remotely. Power design must consider the additional requirements of IoT connectivity, such as power over Ethernet (PoE) or wireless power transfer, to ensure seamless communication and enable the full potential of IoT features.

Moreover, IoT-enabled LED devices often involve sensors, data transmission, and advanced control algorithms. These additional functionalities require efficient power management systems that can handle the increased power demands while maintaining stability and reliability. Proper power design ensures that LED devices can support the connectivity and processing needs of IoT technology, enabling smart automation, energy monitoring, and adaptive lighting control.

In some applications, light devices may need to fix to a ceiling directly.

In such case, safety and convenience of installation of the light device is critical. It is more important when the light device is larger than a size, e.g. a panel light device larger than 10 cm width.

Therefore, it is beneficial to design a lighting apparatus with a installation structure that is easy to install while ensuring safety.

SUMMARY

In some embodiments, a lighting apparatus includes a bracket, a fixing unit and a light body.

The bracket is attached to an installation surface. The bracket has a bracket hook. The bracket hook is extended downwardly from the installation surface. The bracket hook has a horizontal part and a vertical part. An angle between horizontal part and the vertical is between 60 degrees to 120 degrees.

The fixing unit has a plug, an elastic device and a unit housing. The plug has a first end and a second end. The plug and the elastic device are disposed in the unit housing. The second end is coupled to the elastic device. There is an adjustable entrance with a first diameter between the first end of the plug and the unit housing.

The light body has a back cover, a light source and a light opening. The fixing unit is coupled to the back cover.

To install the light body to the installation surface, the adjustable entrance is enlarged by applying an external force to the fixing unit against an elastic force of the elastic device for the horizontal part of the bracket hook to pass through the adjustable entrance.

After the horizontal part of the bracket hook passes through the adjustable entrance, the elastic force recovers the adjustable entrance to the first diameter for coupling the fixing unit to the bracket to install the light body to the installation surface.

In some embodiments, the fixing unit further includes a stop unit originally disposed at a first stop position of the fixing unit.

After the horizontal part of the bracket hook passes through the adjustable entrance.

The stop unit is moved to a second stop position of the fixing unit so that the vertical part of the bracket hook is fixed between the first end of the plug and the stop unit.

In some embodiments, the stop unit has multiple pins respectively corresponding to multiple parameters.

One of the multiple pins is selectively to moved to engage the vertical part of the bracket hook to select the parameter associated to the selected pin.

In some embodiments, the light body has a controller for detecting the detected pin to determine a light configuration to drive the light source.

In some embodiments, the bracket hook is coupled to a ground.

In some embodiments, the light source includes a first LED module with a first light parameter and includes a second LED module with a second light parameter.

The first light parameter is different from the second light parameter.

The multiple pins correspond to different mixed light parameter by mixing lights from the first LED module and the second LED module.

In some embodiments, the stop unit includes a stop screw movable toward the vertical part of the bracket hook.

In some embodiments, a controller of the light body detects whether the stop unit is at the second position.

If the controller finds that the stop unit is not at the second position, the controller drives the light source to issue a warning light pattern.

In some embodiments, the elastic device is a spring unit deformed when the adjustable entrance is enlarged.

In some embodiments, a button is coupled to the plug to enlarge the adjustable entrance to detach the fixing unit from the bracket hook.

In some embodiments, there are multiple fixing units disposed on different positions of the light body.

In some embodiments, the fixing unit further including a lock unit.

The lock unit is movable to engage the plug so that the second end of the plug is confined between the lock unit and the vertical part of the bracket hook.

In some embodiments, the fixing unit further includes a screw, when the second end of the plug engages the horizontal part and the vertical part of the bracket hook, the screw is rotated to move toward the plug so that the second end of the plug is confined between the screw and the vertical part of the bracket hook.

In some embodiments, the light body has a rectangular housing, and there are two fixing units disposed on a lateral side of the rectangular housing.

In some embodiments, a length of the lateral side of the rectangular housing is larger than 10 cm.

In some embodiments, a night light device is movably attached to the lateral side of the rectangular housing.

An electrode is disposed on the lateral side of the rectangular housing for electrically connecting to a controller and a driver of the light body.

The driver provides power to the light source and the night light device.

In some embodiments, the light body has a light sensor and a controller.

When the light sensor detects where there is a predetermined light pattern transmitted from an external light device, the controller selectively turns on the light source according to the predetermined light pattern.

In some embodiments, the predetermined light pattern has an encoded signal to prevent misjudgment of the controller.

In some embodiments, when the external light device is turned on, the controller turns on the light source automatically.

In some embodiments, the encoded signal also indicates the controller to produce a mixed light with a required light parameter.

DETAILED DESCRIPTION

Figure 1:
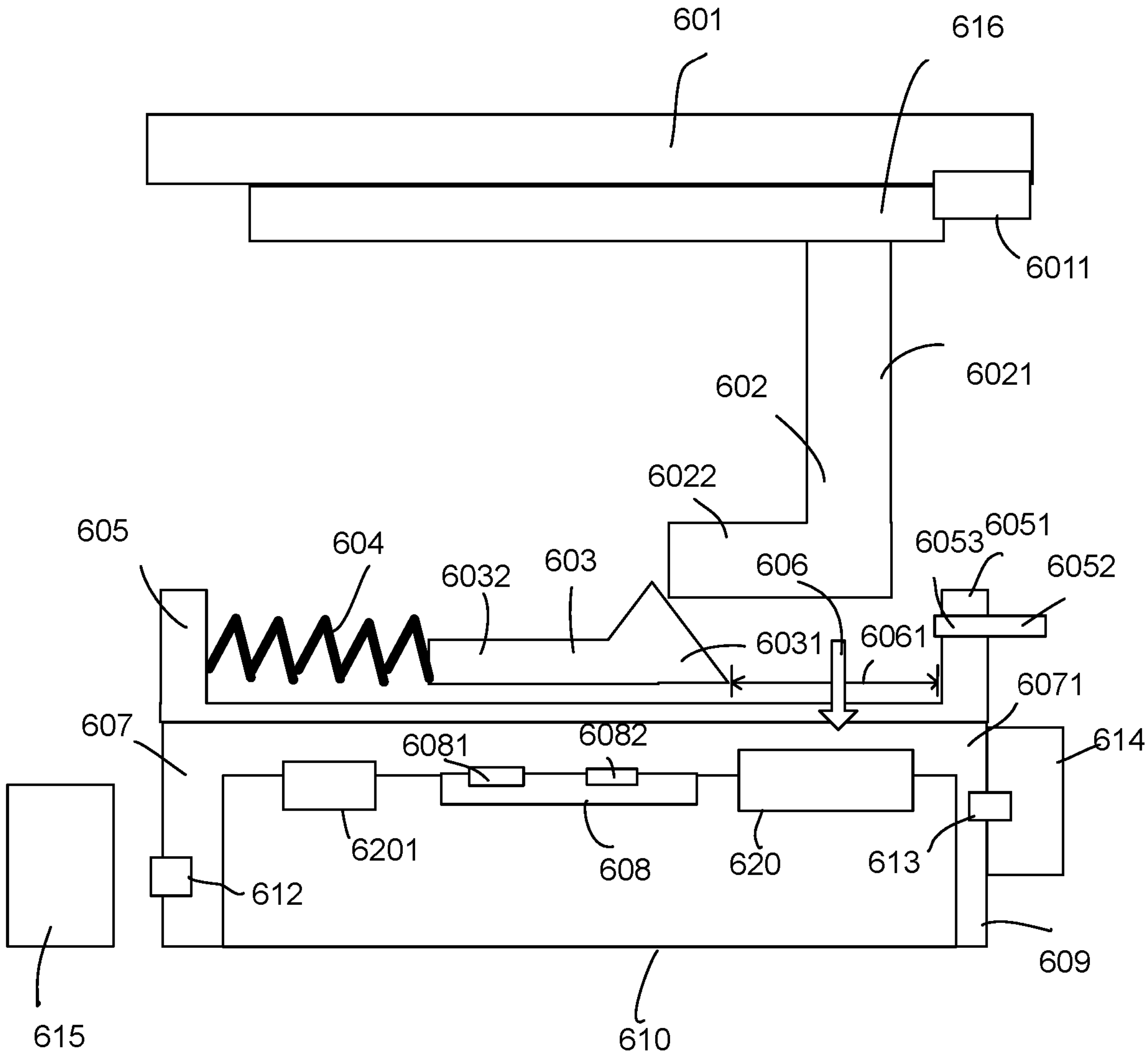
FIG. 1 illustrates a lighting apparatus embodiment.

In some embodiments, a lighting apparatus includes a bracket 616, a fixing unit 605 and a light body 607.

The bracket 616 is attached to an installation surface 601, like a ceiling. The bracket 616 has a bracket hook 602. The bracket hook 602 is extended downwardly from the installation surface 601. The bracket hook 602 has a horizontal part 6022 and a vertical part 6021. An angle between horizontal part and the vertical is between 60 degrees to 120 degrees, e.g. an L shape hook. The bracket hook 602 may be made of plastic or metal material. The bracket 616 may be made of the same or different material as the bracket hook 602 and is attached to the installation surface 601 with screws or other fixing structures.

The fixing unit 605 has a plug 603, an elastic device 604 and a unit housing 6051. The plug 603 has a first end 6031 and a second end 6032. The plug 603 and the elastic device 604 are disposed in the unit housing 6051. The second end 6032 is coupled to the elastic device 604. There is an adjustable entrance 606 with a first diameter 6061 between the first end 6031 of the plug 603 and the unit housing 6051.

The light body 607 has a back cover 6071, a light source 608 and a light opening 610. The fixing unit 605 is coupled to the back cover 6071.

To install the light body 607 to the installation surface 601, the adjustable entrance 606, which is an opening for inserting the bracket hook 602, is enlarged by applying an external force, e.g. users to press or to pull, to the fixing unit 605 against an elastic force of the elastic device 604 for the horizontal part 6022 of the bracket hook 602 to pass through the adjustable entrance 606. The arrow of the adjustable entrance 606 indicates the direction for inserting the bracket hook 602.

After the horizontal part 6022 of the bracket hook 602 passes through the adjustable entrance 606, the elastic force recovers the adjustable entrance 606 to the first diameter 6061 for coupling the fixing unit 605 to the bracket 616 to install the light body 607 to the installation surface 601.

In some embodiments, the fixing unit 605 further includes a stop unit 6052 originally disposed at a first stop position 6053 of the fixing unit 605.

After the horizontal part 6022 of the bracket hook 602 passes through the adjustable entrance 606, the stop unit 6052 is moved to a second stop position of the fixing unit so that the vertical part of the bracket hook is fixed between the first end of the plug and the stop unit.

Figure 5:
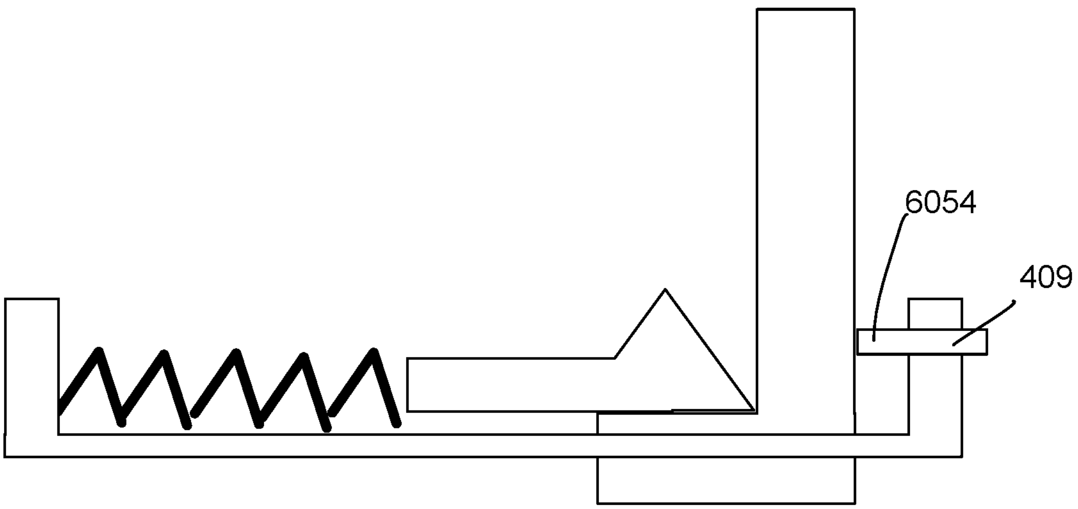
FIG. 5 illustrates a fourth status during installation.

FIG. 5 shows the stop unit is moved to a second stop position 6054.

Figure 7:
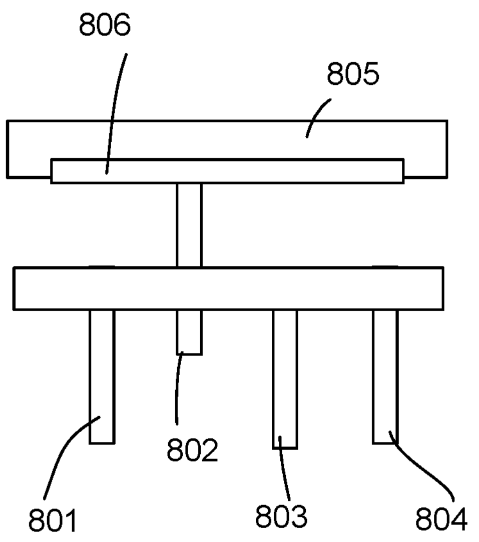
FIG. 7 shows a stop unit with multiple pins.

In FIG. 7, the stop unit has multiple pins 801, 802, 803, 804 respectively corresponding to multiple parameters, e.g. switching to different mixed color temperatures.

One of the multiple pins is selectively to moved to engage the vertical part of the bracket hook 805 to select the parameter associated to the selected pin.

For example, the four pins 801, 802, 803, 804 respectively correspond to color temperatures of 2000K, 2500K, 3000K, 4000K. Users may select one pin of the stop unit to push in to engage the bracket hook. A sensor 806 connected to a controller of the light body detects which pin is inserted to determine what color temperature the user wants to render.

In FIG. 1, the light body has a controller 620 for detecting the detected pin to determine a light configuration to drive the light source 608.

In some embodiments, the bracket hook is coupled to a ground 6011.

In some embodiments, the light source 608 includes a first LED module 6081 with a first light parameter and includes a second LED module 6082 with a second light parameter.

The first light parameter is different from the second light parameter.

The multiple pins correspond to different mixed light parameter by mixing lights from the first LED module 6081 and the second LED module 6082.

In some embodiments, the stop unit includes a stop screw movable toward the vertical part of the bracket hook.

Specifically, there is a screw track so that users may rotate the stop screw to move in or out of the housing of the fixing unit.

In some embodiments, a controller 620 of the light body detects whether the stop unit is at the second position.

If the controller 620 finds that the stop unit is not at the second position, the controller drives the light source to issue a warning light pattern, e.g. to issue a blink light pattern to reminder users to lock the stop unit to the second position.

In some embodiments, the elastic device is a spring unit deformed when the adjustable entrance is enlarged, as illustrated in FIG. 1.

Figure 8:
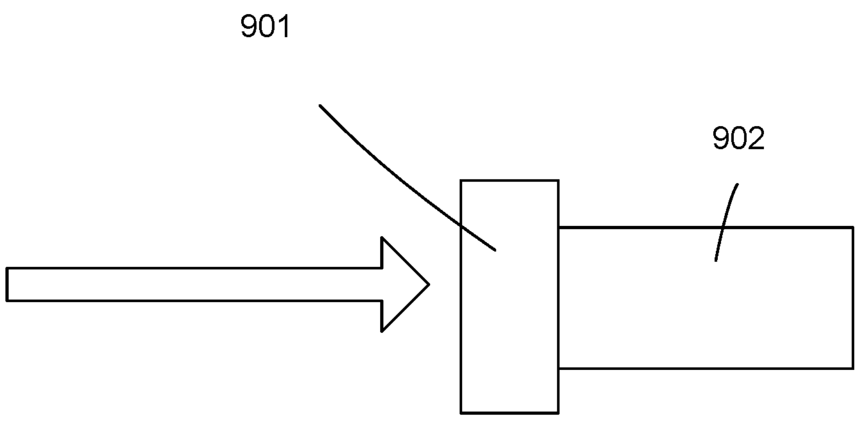
FIG. 8 shows a button used for unlocking the fixing unit.

In FIG. 8, a button 901 is coupled to the plug 902 to enlarge the adjustable entrance to detach the fixing unit from the bracket hook. In such case, when the button 901 is pushed, the adjustable entrance is enlarged.

Figure 6:
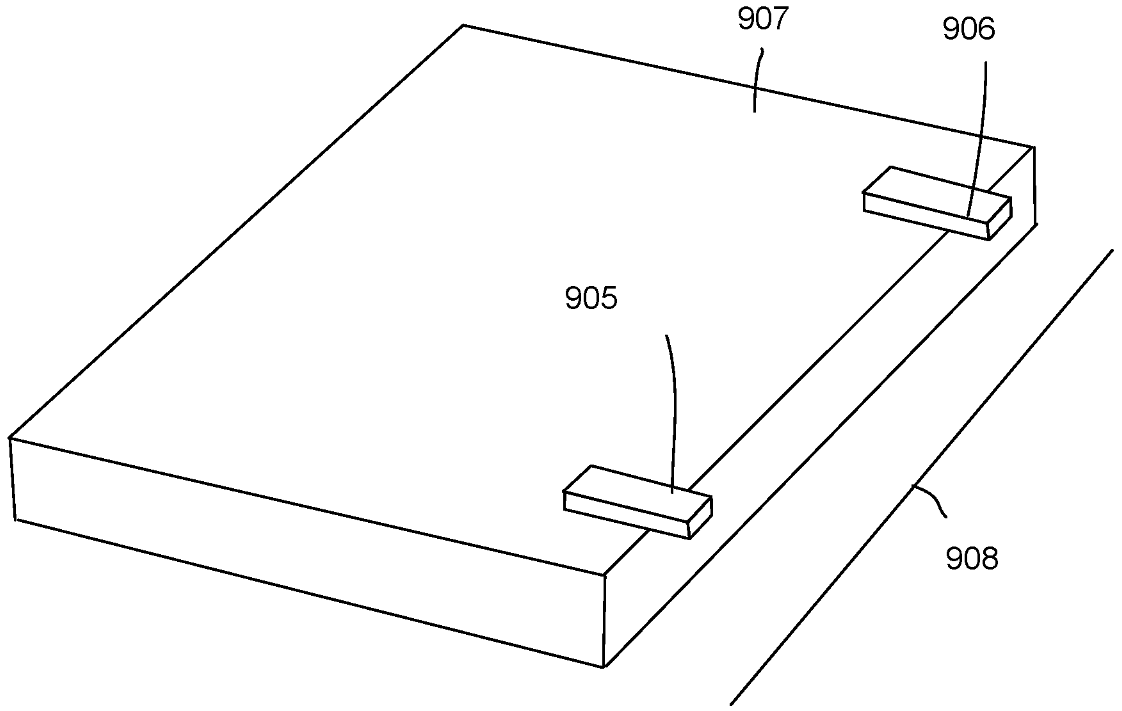
FIG. 6 shows a panel light example.

In FIG. 6, there are multiple fixing units 905, 906 disposed on different positions of the light body.

In some embodiments, the fixing unit further including a lock unit, e.g. the stop unit mentioned above.

The lock unit is movable to engage the plug so that the second end of the plug is confined between the lock unit and the vertical part of the bracket hook.

In some embodiments, the fixing unit further includes a screw, when the second end of the plug engages the horizontal part and the vertical part of the bracket hook, the screw is rotated to move toward the plug so that the second end of the plug is confined between the screw and the vertical part of the bracket hook.

In FIG. 6, the light body has a rectangular housing, and there are two fixing units disposed on a lateral side of the rectangular housing 907.

In some embodiments, a length 908 of the lateral side of the rectangular housing 907 is larger than 10 cm.

In FIG. 1, a night light device 614 is movably attached to the lateral side of the rectangular housing.

An electrode 613 is disposed on the lateral side of the rectangular housing for electrically connecting to a controller 620 and a driver 6201 of the light body 607.

The driver 6021 provides power to the light source 608 and the night light device 614.

In some embodiments, the light body 607 has a light sensor 612 and a controller 620.

When the light sensor 612 detects where there is a predetermined light pattern transmitted from an external light device 615, the controller 620 selectively turns on the light source 608 according to the predetermined light pattern.

In other words, the lighting apparatus is automatically turned on following a neighbor light device. This is particularly helpful if many light devices are deployed at the same time. In past, each light device needs a corresponding path to add a wall switch to control the light device.

With such approach, the lighting apparatus only needs to be connected to a power source, not necessary to connect to a wall switch.

The lighting apparatus detects whether a neighbor lighting apparatus is turned on or not to determine whether to turn on or turn off its light.

In some embodiments, the predetermined light pattern has an encoded signal to prevent misjudgment of the controller.

To prevent detection error, e.g. the light sensor determines the light should be turned on when the ambient light from window triggers the condition, a special light pattern, e.g. with a periodically turned-off or a certain light frequency may be adopted as the signal, instead of only detecting ambient light intensity.

In some embodiments, when the external light device is turned on, the controller turns on the light source automatically.

In some embodiments, the encoded signal also indicates the controller to produce a mixed light with a required light parameter. Other signals may be encoded, e.g. a special light pattern over time, to carry more information, e.g. to indicate a color temperature, a password, or other information.

Please refer to FIG. 2 to FIG. 5, which illustrate an insertion operation.

Figure 2:
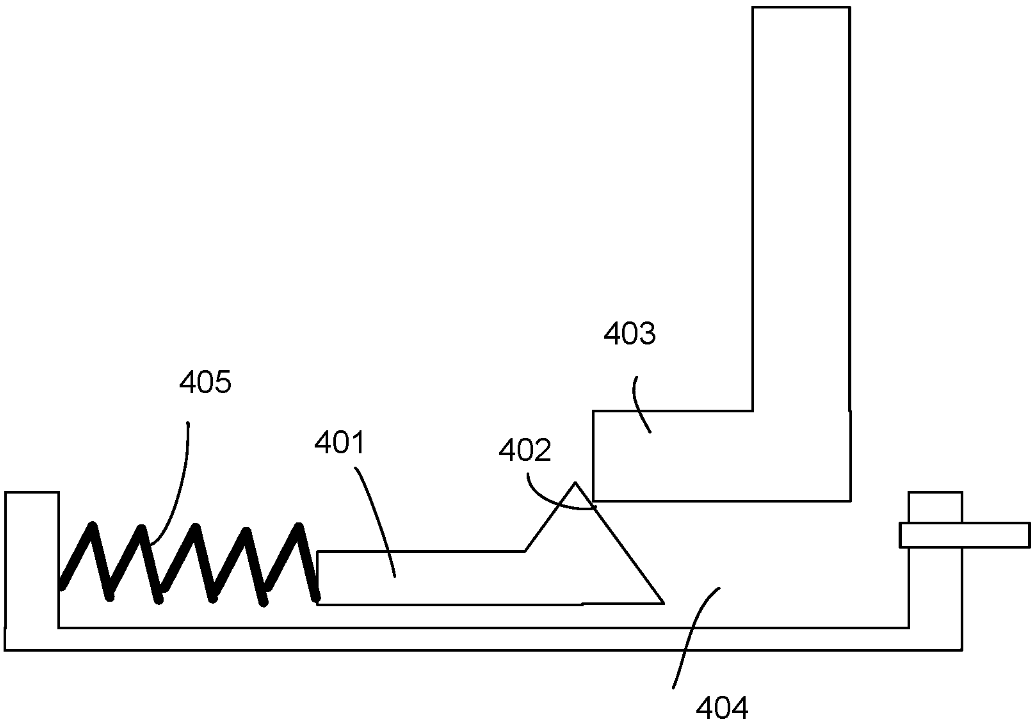
FIG. 2 illustrates a first status during installation.

In FIG. 2, a slope surface 402 is provided to the plug 401. When users lift the fixing unit upwardly, the slope surface 402 of the plug 401 converts upward force to a horizontal fraction to press the elastic device 405. In FIG. 2, the adjustable entrance 404 has a first diameter.

Figure 3:
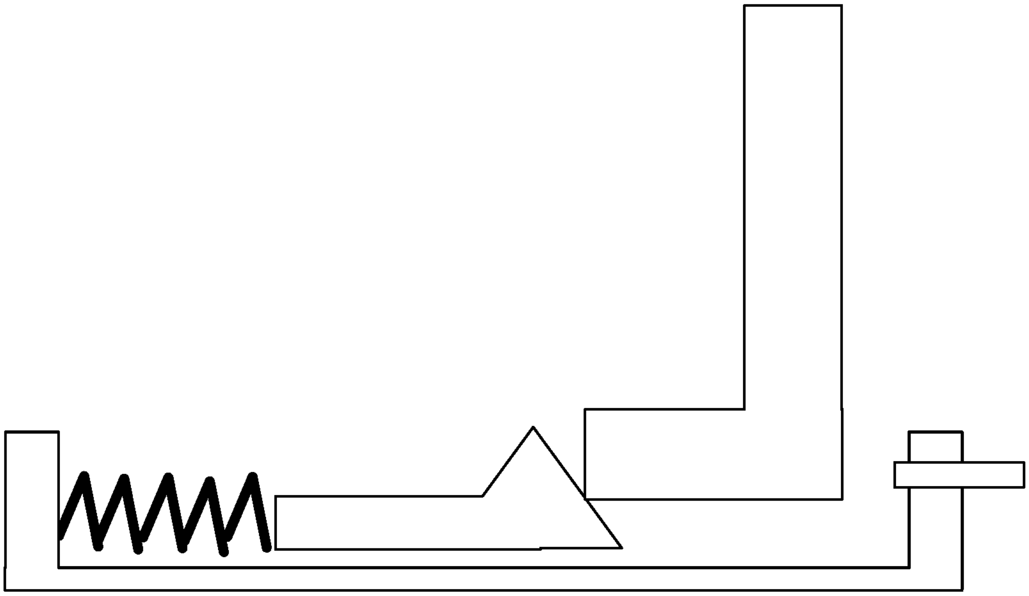
FIG. 3 illustrates a second status during installation.

FIG. 3 shows the adjustable entrance 404 is enlarged for the bracket hook 403 to move downwardly.

Figure 4:
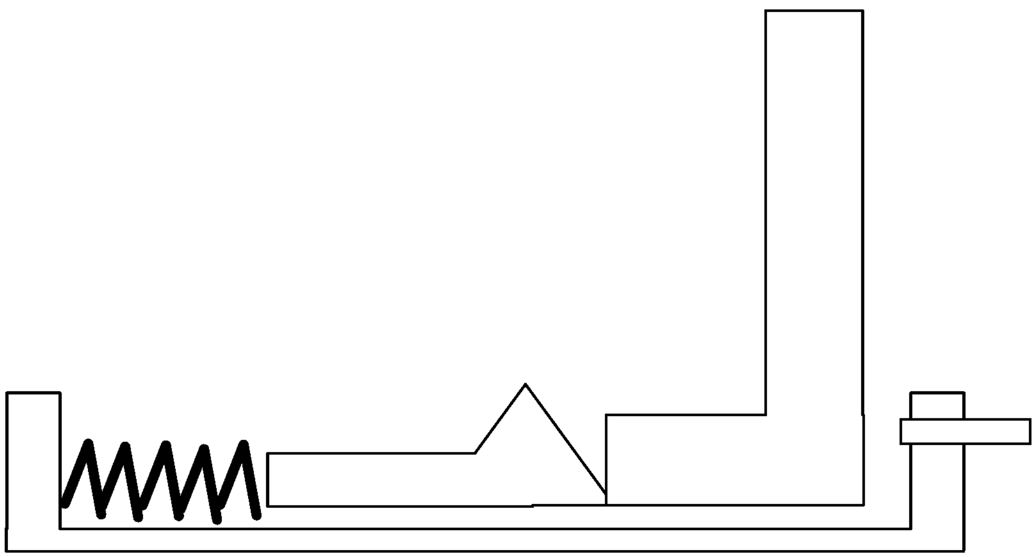
FIG. 4 illustrates a third status during installation.

FIG. 4 shows a next step that the bracket hook 403 passes the adjustable entrance.

FIG. 5 shows that when the bracket hook 403 passes the adjustable entrance, the elastic device uses its elastic force to keep the plug to move leftward to engage the vertical part of the bracket hook.

In addition, the stop unit 409 is moved to a second position 6054 to clip the bracket hook together with the plug.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:

a bracket to attach to an installation surface, wherein the bracket has a bracket hook, wherein the bracket hook is extended downwardly from the installation surface, wherein the bracket hook has a horizontal part and a vertical part, wherein an angle between horizontal part and the vertical is between 60 degrees to 120 degrees;

a fixing unit having a plug, an elastic device and a unit housing, wherein the plug has a first end and a second end, wherein the plug and the elastic device are disposed in the unit housing, wherein the second end is coupled to the elastic device, wherein there is an adjustable entrance with a first diameter between the first end of the plug and the unit housing; and a light body having a back cover, a light source and a light opening, wherein the fixing unit is coupled to the back cover, wherein to install the light body to the installation surface, the adjustable entrance is enlarged by applying an external force to the fixing unit against an elastic force of the elastic device for the horizontal part of the bracket hook to pass through the adjustable entrance, wherein after the horizontal part of the bracket hook passes through the adjustable entrance, the elastic force recovers the adjustable entrance to the first diameter for coupling the fixing unit to the bracket to install the light body to the installation surface.

2. The lighting apparatus of claim 1, wherein the fixing unit further comprises a stop unit originally disposed at a first stop position of the fixing unit, wherein after the horizontal part of the bracket hook passes through the adjustable entrance, wherein the stop unit is moved to a second stop position of the fixing unit so that the vertical part of the bracket hook is fixed between the first end of the plug and the stop unit.

3. The lighting apparatus of claim 2, wherein the stop unit has multiple pins respectively corresponding to multiple parameters, wherein one of the multiple pins is selectively to moved to engage the vertical part of the bracket hook to select the parameter associated to the selected pin.

4. The lighting apparatus of claim 3, wherein the light body has a controller for detecting the detected pin to determine a light configuration to drive the light source.

5. The lighting apparatus of claim 3, wherein the bracket hook is coupled to a ground.

6. The lighting apparatus of claim 3, wherein the light source comprises a first LED module with a first light parameter and comprises a second LED module with a second light parameter, wherein the first light parameter is different from the second light parameter, wherein the multiple pins correspond to different mixed light parameter by mixing lights from the first LED module and the second LED module.

7. The lighting apparatus of claim 2, wherein the stop unit comprises a stop screw movable toward the vertical part of the bracket hook.

8. The lighting apparatus of claim 2, wherein a controller of the light body detects whether the stop unit is at the second position, wherein if the controller finds that the stop unit is not at the second position, the controller drives the light source to issue a warning light pattern.

9. The lighting apparatus of claim 1, wherein the elastic device is a spring unit deformed when the adjustable entrance is enlarged.

10. The lighting apparatus of claim 9, wherein a button is coupled to the plug to enlarge the adjustable entrance to detach the fixing unit from the bracket hook.

11. The lighting apparatus of claim 1, wherein there are multiple fixing units disposed on different positions of the light body.

12. The lighting apparatus of claim 1, wherein the fixing unit further comprising a lock unit, wherein the lock unit is movable to engage the plug so that the second end of the plug is confined between the lock unit and the vertical part of the bracket hook.

13. The lighting apparatus of claim 12, wherein the fixing unit further comprises a screw, when the second end of the plug engages the horizontal part and the vertical part of the bracket hook, the screw is rotated to move toward the plug so that the second end of the plug is confined between the screw and the vertical part of the bracket hook.

* * * * *